United States Patent [19]
Odaka

[11] Patent Number: 4,953,168
[45] Date of Patent: Aug. 28, 1990

[54] DIGITAL SIGNAL RECORDING APPARATUS

[75] Inventor: Kentaro Odaka, Tokyo, Japan

[73] Assignee: Sony Corporation, Tokyo, Japan

[21] Appl. No.: 262,523

[22] Filed: Oct. 25, 1988

[30] Foreign Application Priority Data

Oct. 31, 1987 [JP] Japan .................. 62-276931

[51] Int. Cl.⁵ .......................................... G06F 11/10
[52] U.S. Cl. .......................... 371/37.4; 358/343
[58] Field of Search ............ 371/37.1, 37.4, 37.5, 371/39.1; 360/19.1, 26, 32; 358/336, 341, 343

[56] References Cited

U.S. PATENT DOCUMENTS

| 4,602,295 | 7/1986 | Moriyama et al. | 358/343 |
| 4,604,655 | 8/1986 | Moriyama | 358/343 |
| 4,812,924 | 3/1989 | Fukami et al. | 360/32 |
| 4,839,755 | 6/1989 | Yamada et al. | 371/37.4 |

Primary Examiner—Charles E. Atkinson
Attorney, Agent, or Firm—Philip M. Shaw, Jr.

[57] ABSTRACT

A rotary head, magnetic tape, digital signal recording apparatus in which the sampling frequency of digital information signals to be recorded cannot be completely divided during the encoding process by the frequency of a unit of an error correcting code consisting of a plurality of samples or the like includes circuitry for setting a numerical value of 2 or more which is an integer value near a quotient when the sampling frequency is divided by the frequency of the unit; comparing the count value of the number of input samples to be recorded with a numerical count value of 2 or more; determining the number of samples included in the unit by the output of the comparison and accordingly controlling an address in a memory of the recording apparatus.

10 Claims, 17 Drawing Sheets

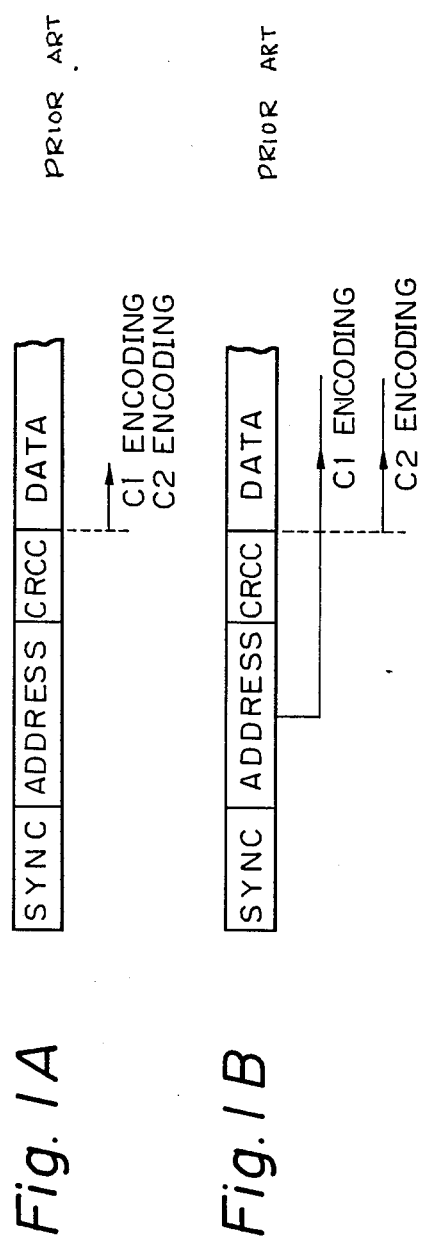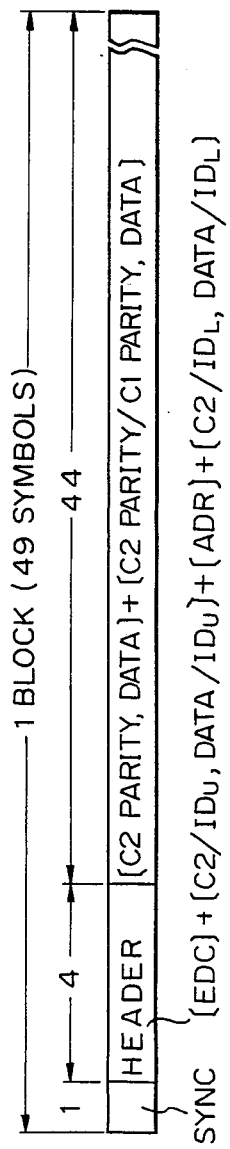
Fig. 1A PRIOR ART
Fig. 1B PRIOR ART
Fig. 2

Fig. 5B

| 22 | 23 | 24 | 25 | 26 | 27 | 28 | --------- | 58 | 59 |
|---|---|---|---|---|---|---|---|---|---|
| | | | | | | SYNC | | | |
| | | | | | | EDC | | | |
| | | | | | | IDu | | | |
| | | | | | | ADR | | | |
| | | | | | | IDl | | | |
| R1u | R441u | L3u | L443u | R3u | R443u | L5u | | R19u | R459u |
| R21u | R461u | L23u | L463u | R23u | R463u | L25u | | R39u | R479u |
| | | | | | | | | | |
| | | | | ODD WORD AREA | | | | | |
| | | | | | | | | | R799u |
| | R761l | | | | | | | | R779l |
| | R781l | | | | | | | | R799l |
| C1 PARITY | | C1 PARITY | | C1 PARITY | | | | | C1 PARITY |

Fig. 5C

| 60 | 61 | 62 | 63 | 64 | 65 | 66 | 67 | 68 --- |
|---|---|---|---|---|---|---|---|---|
| L 2u | L442u | R 2u | R442u | L4u | L444u | R4u | R444u | L6u |
| L22u | L462u | R22u | R462u | L24u | L464u | R24u | R464u | L26u |
| L2l | | | | | | | | |
| L22l | | | | | | | | |

Y    P

| | C1 PARITY | | C1 PARITY | | C1 PARITY | | C1 PARITY | |

Fig. 5D

| | | 96 | 97 | 98 | 99 |
|---|---|---|---|---|---|
| | SYNC | | | | |
| | EDC | | | | |
| | IDu | | | LOu | ROu |
| | ADR | | | | |
| | IDl | | | LOl | ROl |
| | | | L20u | L460u | R20u | R480u |
| | | | L40u | L480u | R40u | R480u |
| | | | | | | |
| | | | | Q | | |
| EVEN WORD AREA | | | | | | |
| | | | | L800u | | R800u |
| | | | | L800l | | R800l |
| | | | | C1 | | C1 |
| | | | | P | | P |
| | | | | A | | A |
| | | | | R | | R |
| | | | | I | | I |
| | | | | T | | T |
| | | | | Y | | Y |

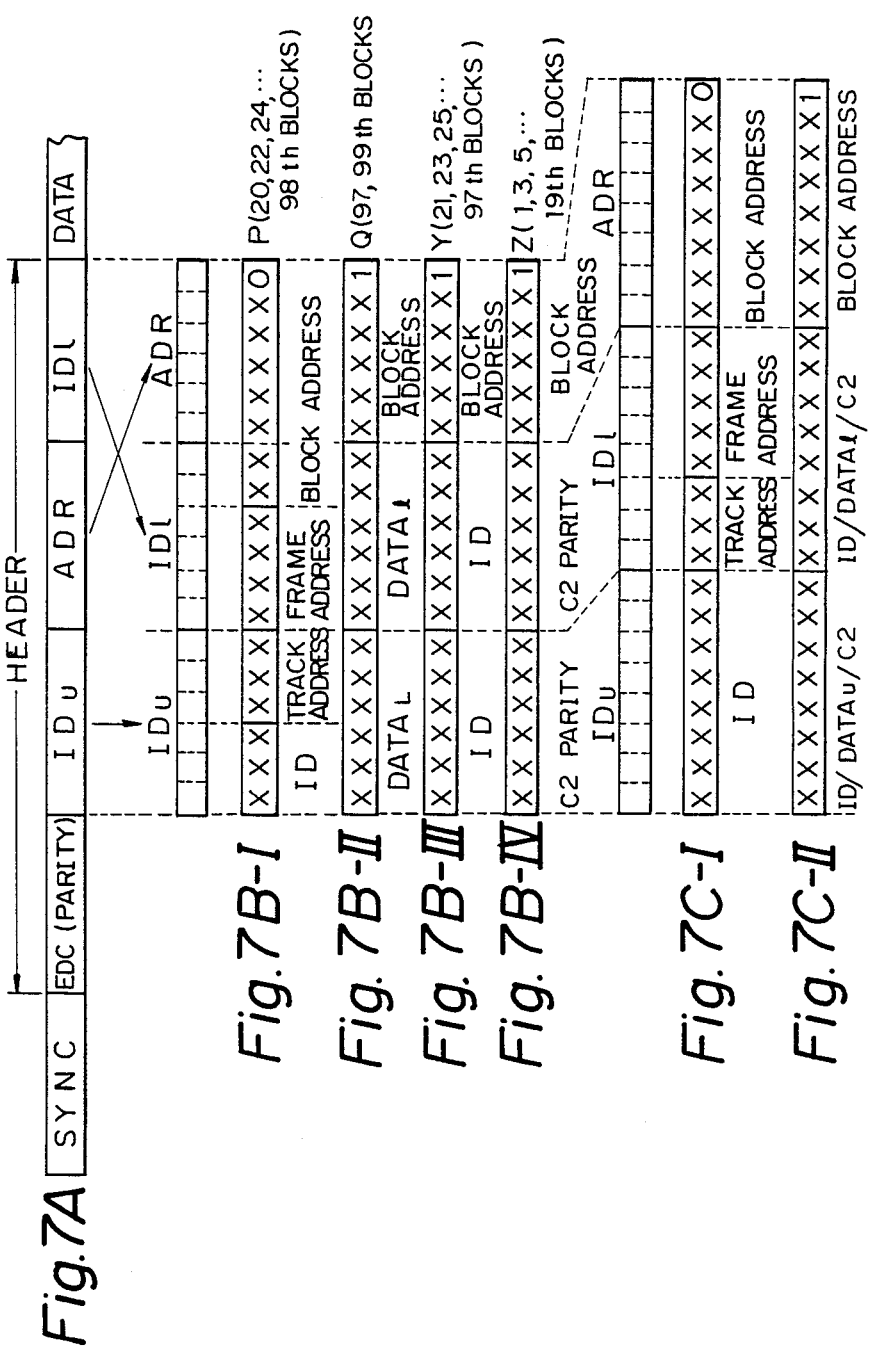

| Fig. 8A | Fig. 8B |

|  | 0 | ------- 19 | 20 | 21 | ------------------- |
|---|---|---|---|---|---|
|  |  | SYNC |  |  | SYNC |
| 0 |  | EDC |  |  | EDC |
| 1 |  | C2 PARITY or IDu |  |  | IDu |
| 2 |  | ADR |  |  | ADR |
| 3 |  | C2 PARITY or IDl |  |  | IDl |
| 4 |  |  | L1u |  |  |
| 5 |  |  | L25u |  |  |
| ... | C2 | PARITY |  |  |  |
| 37 |  |  |  |  |  |
| 38 |  |  | C1 | C1 |  |
| 39 |  |  | P | P |  |
| 40 |  |  | A | A |  |
| 41 |  |  | R | R |  |
| 42 |  |  | I | I |  |
| 43 |  |  | T | T |  |
| 44 |  |  | Y | Y |  |
| 45 |  |  |  |  |  |
| 46 |  |  |  |  |  |
| 47 |  |  |  |  |  |

Fig. 8B

| | 66 | 67 | 68 -------- 113 | 114 | 115 |
|---|---|---|---|---|---|
| | | | SYNC | | |
| | | | EDC | | |
| | | | IDu | LOu | ROu |
| | | | ADR | | |
| | | | IDl | LOl | ROl |
| | R23u | L2u | | | R24u |
| | R47u | L26u | | | R48u |
| | | | | | |
| | | L959u | | | ✕ |
| | | L959l | | | ✕ |
| | C1 PARITY | | C1 | C1 PARITY | C1 PARITY |

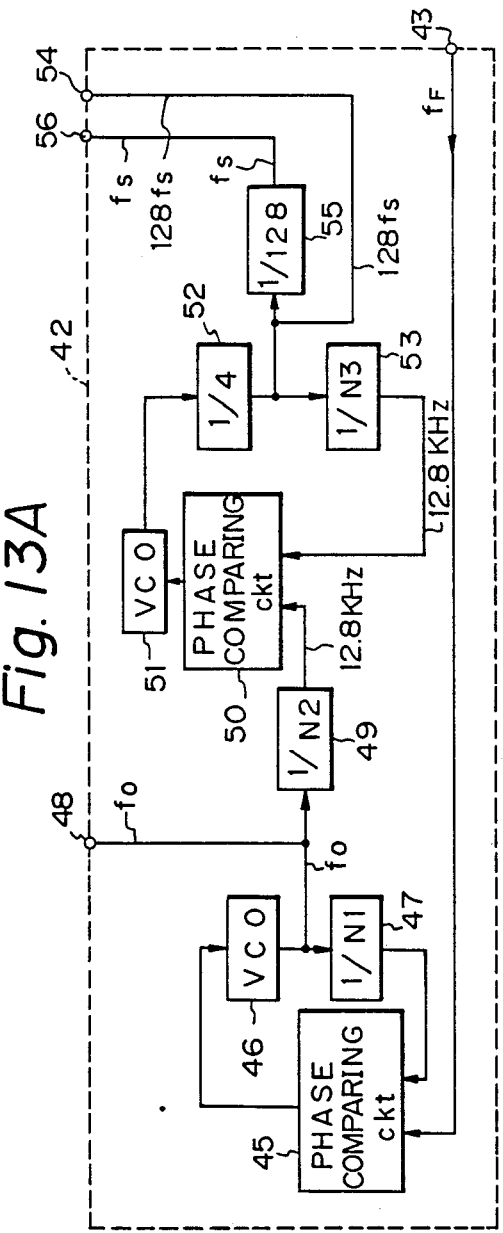

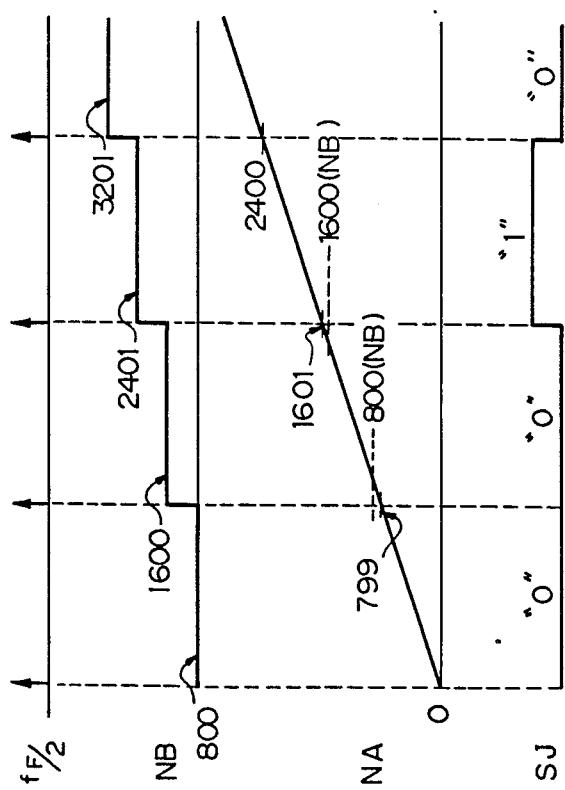

DIGITAL SIGNAL RECORDING APPARATUS

BACKGROUND OF THE INVENTION

1. Field of the Invention

The present invention relates to an encoding apparatus and method for error correction which is applied to record, for instance, audio PCM signals onto a magnetic tape by rotary heads and, more particularly, to an apparatus and method for error correction which is provided in a digital encoder to record high quality audio PCM data, as disclosed in U.S. Pat. No. 4,551,771.

2. Description of the Prior Art

There is a known error correction encoding apparatus and method for use with information symbols arranged two-dimensionally in a matrix form in which encoding processes of error detection and error correction codes, e.g., Reed Solomon codes are executed in each of the vertical and lateral directions of the information symbols. These codes are transmitted for each column in the vertical direction. On the reception side, the error correction is performed by using a first error detection code and a first error correction code and, at the same time, a pointer indicative of the presence or absence of errors is formed. Next, the errors are corrected by a second error detection code and a second error correction code with reference to this pointer.

In the case where the foregoing error correction encoded data is transmitted for each column, a sync signal and sub-data such as a block address and the like are added to thereby form one block of data. For example, in U.S. Pat. No. 4,630,272, there is shown a method whereby a sync signal and an address in which error detection can be independently performed by a CRC code are added to each column of data and to the parity data of a first error correction code, thereby forming one block. In the above U.S. Patent, as shown in FIG. 1A herein, for the address, the error detection can be executed by the CRC code and for a data portion (PCM audio signals), encoding processes of a first error correction code (referred to as a C1 code) and a second error correction code (referred to as a C2 code) are performed. In the case of the encoding by FIG. 1A, however, since the C1 code is not applied to the address, the protection against errors is insufficient.

To solve this problem, for example, as disclosed in U.S. Pat. No. 4,682,332 and as shown herein in FIG. 1B, an error correction encoding is proposed in which an encoding by a C1 code is also executed for the address.

When a header consists of only an address, the error correction encoding shown in FIG. 1B is useful. However, if PCM audio signals (main data) are included in the header in addition to the address, the encoding by the C1 code is only executed for the main data and there is a problem in that the protection for errors is insufficient for a reason to be mentioned later. Encoding by the C2 code of the whole header, including the address, to eliminate this drawback causes an inconvenience in that the data area in which the addresses are recorded is lost by the existence of the C2 parity.

To solve such a problem, the applicant of the present patent application has proposed an error correction encoding apparatus in which a whole header together with a data portion is C1 encoded and the encoding of a C2 code is performed for the main data included in the header, excluding addresses, thereby enabling error protection the part of the main data included in the header to be made strong, so that the main data can be recorded into the header part. This error correction encoding apparatus is suitable when it is used in what is called an 8-mm VTR as disclosed in U.S. Pat. No. 4,551,771 in which both a video signal of one field and audio PCM signals of one field, i.e., time base compressed audio PCM signals are recorded on a magnetic tape by a single scan.

In the already commercialized 8-mm VTR, a sampling frequency of the audio PCM signals is selected to be $2f_h$ ($f_h$: horizontal frequency). Therefore, the rotary heads which rotate at a frame frequency and a sampling system are synchronized, and the problem of asynchronization between an image and an audio sound does not occur. However, there is a problem in that the sampling frequency of the conventional 8-mm VTR is too low with respect to a point that audio signals of a high quality are recorded and reproduced. In addition, there is a problem of the absence of matching with the sampling frequencies (44.1 kHz, 48 kHz, 32 kHz, etc.) which are used in other digital audio apparatuses such as CD players and rotary head type digital audio tape recorders (R-DATs). Therefore, it is preferable to be able to use those frequencies (44.1 kHz, 48 kHz, 32 kHz, etc.) as the sampling frequency of the audio PCM signals in the 8-mm VTR.

However, since there is no integer ratio relation between the above-mentioned frequency and, e.g., the field frequency (59.94 kHz) of the NTSC system, the number of sampling data included in one field period is not an integer. Therefore, when both a video signal and audio PCM signals are recorded on the same track, as in the 8-mm VTR, the problem occurs of asynchronization between the video image and the corresponding audio sound.

OBJECTS AND SUMMARY OF THE INVENTION

It is, therefore, an object of the present invention to provide a digital signal recording apparatus in which even in the case where the sampling frequency of an audio PCM signal cannot be evenly divided by the encoding frequency, e.g., by a field frequency, video/audio synchronization can be maintained.

It is another object of the present invention to provide a digital signal transmitting or recording apparatus for error correction encoding a plurality of samples of a digital information signal, wherein the number of samples included in a unit (e.g., a unit corresponding to one field of the video signal) in the error correction encoding is changed and a discrimination signal indicative of the number of samples is transmitted.

According to the present invention there is provided a digital signal recording apparatus for recording digital signals in which the sampling frequency of the digital information signals cannot be completely divided by the frequency of a unit of the error correcting code employed during the recording. The recording apparatus is of the type which includes an analog to digital converter for converting analog input signals into digital information signals, an encoder for performing encoding of an error correcting code with regard to the digital information signals, memory means for use in the encoding, an address generator for controlling a write operation and a read operation of the memory means and recording means for recording the output data of the encoder onto a magnetic tape by means of rotary magnetic heads.

The digital signal recording apparatus according to the invention further comprises:
  means for setting a numerical value of 2 or more, which is an integer value near a quotient, when the sampling frequency is divided by the frequency of the unit of the error correcting code;
  means for comparing a count value of the number of input samples to be recorded and a count value selected from the numerical values of 2 or more and producing a corresponding output signal;
  word control means for determining the number of samples included in the unit by the output signal of the comparison means; and
  means for controlling an address from the address generator by the word control means.

The data recorded is organized into blocks. One block is formed by: a header consisting of a block address, an ID signal, and data; and a data block consisting of only main data. Audio PCM signals are recorded in a format in which a two-dimensional array of symbols in which a plurality of blocks are arranged is used as a unit. The two-dimensional array includes the data of one field of the audio PCM signals. The error correction encoded data of one field are time base compressed and recorded onto a magnetic tape.

In the case of the NTSC system, the field frequency is 59.94 Hz. When the sampling frequency is 48 kHz, the sampling frequency cannot be divided by the field frequency. That is, (48000÷59.94=800.8). Integers of 2 or more which are close to the quotient, for instance, 800 and 801 are then chosen. The number of samples (words) of audio PCM signals to be recorded is counted. This count value and a count value selected from the foregoing numerical values are compared at a field period. When the count value of the number of samples is larger than the count value of the set numerical value, 801 is selected. However, when the count value of the number of samples is smaller than the count value of the set numerical value, 800 is selected.

This selected number of samples is recorded as the data of one field. Therefore, even if the number of samples of one field is an integer, the foregoing number of samples which is close to the quotient which is not an integer is recorded in an average manner and the occurrence of asynchronization between a video image and an audio sound can be prevented. Kn the other hand, since the ID signal indicative of the number of samples (800/801) is recorded magnetically the data can be decoded on the reception side without any trouble.

BRIEF DESCRIPTION OF THE DRAWINGS

FIGS. 1A and 1B are schematic diagrams which are used in an explanation of a conventional error correction code;

FIG. 2 is a schematic diagram showing a block constitution of an embodiment of the present invention;

FIGS. 5A, 5B, 5C, 5D and 6 are schematic diagrams which are used in the explanation of an example of the interleave of data;

FIGS. 7A, 7B-I, 7B-II, 7B-III, 7B-IV, 7C-I and 7C-II are schematic diagrams which are used in the explanation of the constitution of a header;

FIGS. 8A and 8B are a schematic diagram of another example of a frame constitution;

FIG. 13A is a block diagram of a clock generating circuit, and FIG. 13B is a table showing the frequency dividing ration N3 of the frequency dividing circuit depicted in FIG. 13A;

FIGS. 15A, 15B, 15C, and 15D are waveform diagrams for use in explaining the operation of the circuit depicted in FIG. 14.

DESCRIPTION OF THE PREFERRED EMBODIMENTS

An embodiment of the present invention will be described hereinbelow with reference to the drawings. This description will be made in accordance with the following order.
  a. Block constitution and frame constitution
  b. An example of data interleave
  c. An example of constitution of a header
  d. Recording and reproducing circuit
  e. Word number control circuit
  f. Modification a. A block constitution and a frame constitution

FIG. 2 shows a constitution of one block of data, e.g., audio data which is recorded onto a magnetic tape. This block corresponds to the amount of PCM data recorded in one track of the magnetic tape. One block consists of 49 symbols. A block sync signal of one symbol is located at the head of one block. Next, a header of four symbols is located. Then, a data portion of 44 symbols is located. As will be explained later, the header comprises: an ID signal, data, or a C2 parity; a block address ADR; and an error detection code EDC such as simple parity, CRC, or the like for them. The data portion comprises: data (audio PCM signals) or a C2 parity; or data or a C2 parity and a C1 parity.

Figure 3:
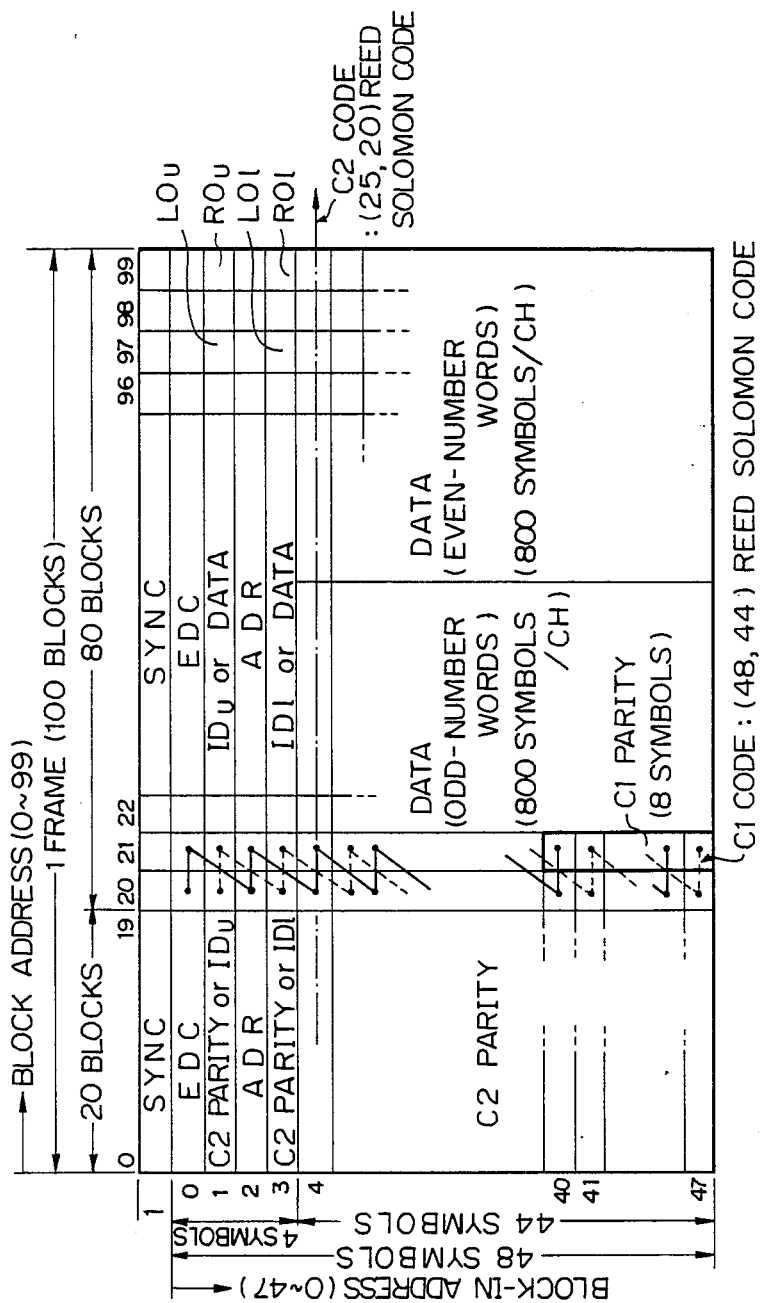
FIG. 3 is a schematic diagram showing a frame constitution of the embodiment of the invention.

As shown in FIG. 3, one frame is constructed by arranging the above-mentioned blocks into 100 columns. Block-in-addresses of 0 to 47 are added to 48 symbols in the vertical direction, excluding the block sync signal, in a matrix-shaped frame construction, and block addresses 0 to 99 are added to 100 blocks in the lateral direction.

The audio PCM signals and C1 parity are included in 44 symbols x 80 blocks in the block addresses 20 to 99 and block-in addresses 4 to 47. When the sampling frequency is 48 kHz, the PCM audio signals of one field of the NTSC system are set to $$48{,}000 \times \frac{1}{59.94} = 800.8 \text{ (words)}$$

As will be obvious from this equation, the sampling frequency cannot be evenly divided by the field frequency. To solve this problem, in the frame constitution shown in FIG. 3, the cases of both 800 words and 801 words which are recorded mixedly exist. However, in the following description of the code constitution, the frame constitution has 801 words.

In the case of performing a linear digitization of 16 bits, each word is divided into an upper eight bits and a lower eight bits and one symbol is set equal to eight bits. On the other hand, when one word consists of 12 bits, one symbol is set equal to six bits. Besides 48 kHz, the sampling frequency can be set to 44.1 kHz or 32 kHz.

Referring to FIGS. 5A, 5B, 5C and 5D, symbols L0u and R0u (FIG. 5D) on the upper side of words L0 and R0 in the heads of the audio PCM signals LO to L800, RO to R800 of the left and right channels are set to 1 in the block-in address and are arranged in the block addresses 97 and 99. On the other hand, symbols L0l and R0l on the lower side are set to 3 in the block-in address and are arranged in the block addresses 97 and 99. Among the remaining 800 words in each channel, the 800 symbols of the odd-number designated words are arranged in the block addresses 20 to 59 and the 800 symbols of the even-number designated words are arranged in the block addresses 60 to 99.

Figure 4:
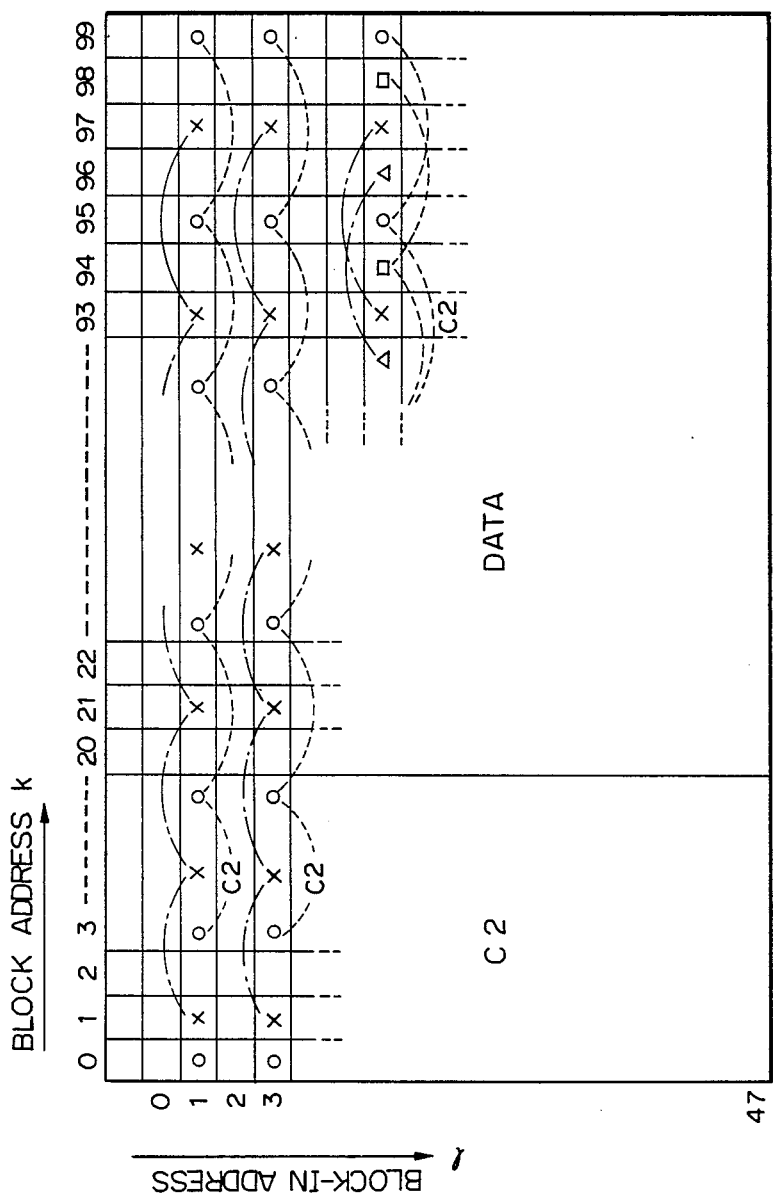
FIG. 4 is a schematic diagram which is used in the explanation of the formation of a C2 code.

The parity (C2 parity) of the second error correction code (C2 code) is included in 20 blocks x 44 symbols in the block addresses 0 to 19 and block-in addresses 4 to 47. As shown in FIG. 4, the C2 code is a (25, 20) Reed Solomon code which is formed for groups of 20 symbols, every four blocks of which are arranged in the lateral direction. Since four series of this C2 code are formed with respect to one row, the C2 parities of $4\times 5=20$ symbols are included in one row. Therefore, the encoding processes of the C1 code and C2 code are executed for all of the symbols of 44 symbols x 80 blocks in the block addresses 20 to 99 and block-in addresses 4 to 47.

The error detection code EDC for the header is included in the block-in address 0 and block addresses 0 to 99. The encoding process of the C2 code is not performed for the error detection code EDC. This is a feature of this invention.

An ID signal IDu or data L0u and R0u are included in the block-in address 1 and block addresses 20 to 99. The C2 parities of $5\times 2=10$ symbols formed from this data are included in the block-in address 1 and block addresses 1, 3, 5, 7, ..., 17, 19. Five symbols are needed for each of data L0u and R0u. An ID signal IDu is included in the block-in address 1 and block addresses 0, 2, 4, 6, ..., 16, 18. See the upper part of FIG. 5A.

The block address ADR is included in the block-in address 2 and block addresses (0 to 99). The encoding of the C2 code is not executed for the block address ADR. This is another feature of this invention.

The ID signal IDl or data L0l and R0l are included in the block-in address 3 and block addresses 20 to 99. The C2 parities of $5\times 2=20$ symbols formed from this data are included in the block-in address 3 and block addresses 1, 3, 5, 7, ..., 17, 19. The ID signal IDl is included in the block-in address 3 and block addresses 0, 2, 4, 6, ..., 17, 18.

The encoding by the C1 code is executed for all one hundred of the blocks in a manner similar to the method described in U.S. Pat. No. 4,630,272. The C1 code is a (48, 44) Reed Solomon code. The series of this C1 code is constructed so as to exist in two adjacent blocks. That is, one C1 series is formed by the even-number designated symbols 0, 2, 4, 6, ... of the block-in address of the series of symbols of two adjacent blocks (e.g., blocks 20 and 21 shown in FIG. 6). Another C1' series is formed by the odd-number designated symbols 1, 3, 5, 7, ... of the block-in address. The reason why the C1 series are formed so as to exist in two blocks is to prevent the two symbols in one C1 series from becoming errors due to errors generated at the boundary of two continuous symbols upon recording. The C1 parities (8 symbols) of two adjacent blocks are arranged in the block-in addresses 40 to 47 of the odd-number block addresses.

Upon recording, the C2 parity is formed by the data and ID signal. Next, the C1 parity is formed from these data. Upon reproduction, error detection and/or error correction is executed by means of the C1 code. A pointer is set for the symbols which cannot be error corrected. The error detection and error correction of the C2 code are executed by reference to this pointer. In addition, upon reproduction, error detection regarding the header is performed using the error detection code EDC.

The production of the C2 code will be again explained with reference to FIG. 4. As shown in FIG. 4, the block-in addresses 0, 1, ..., 47 are expressed as l and the block addresses 0, 1, ..., 99 are expressed as k. When l=0 and l=2, the encoding by the C2 code is not executed, since audio data does not exist. When l=1, only the C2 series including the data L0u and R0u (series marked by 0 and X) is formed. When l=3, only the C2 series including the data L0l and R0l (series marked by 0 and X) is formed. When l=4 to 47, the C2 series (series marked by 0, X, △ and □) is formed for all of the data.

b. An example of data interleave

Figure 5A:
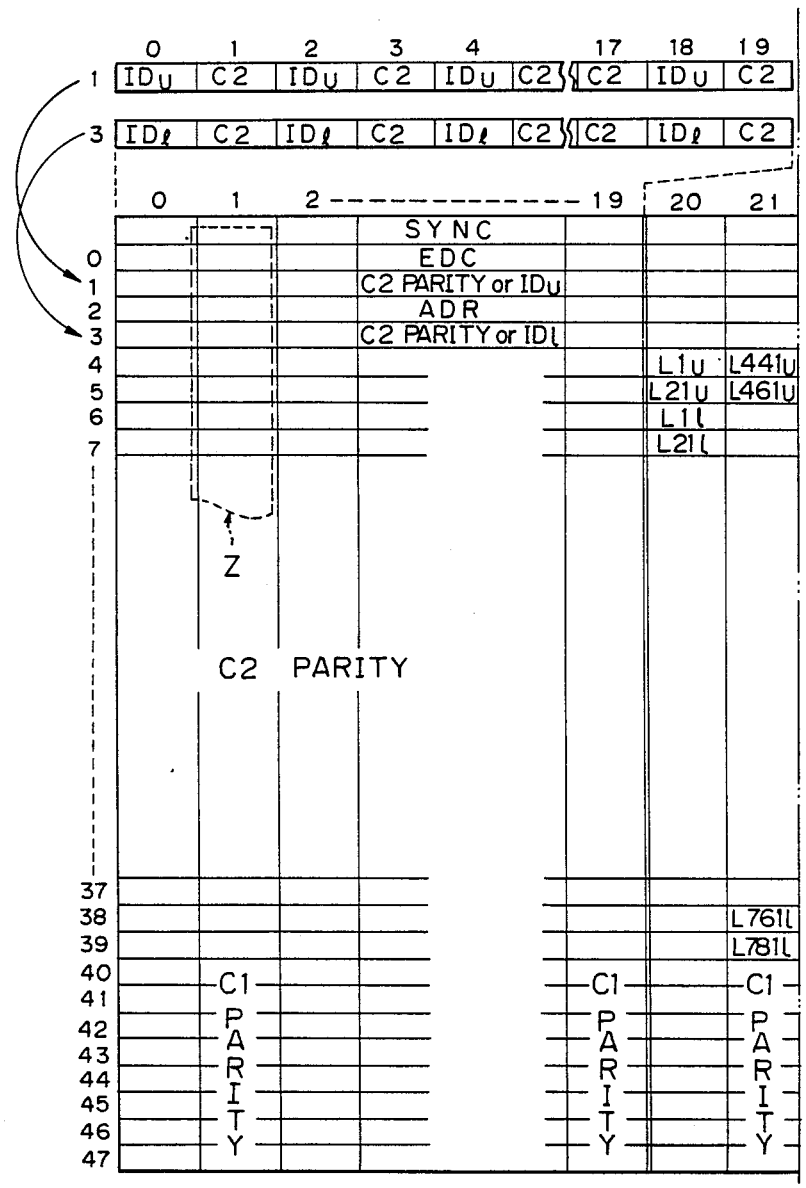
Figure 6:
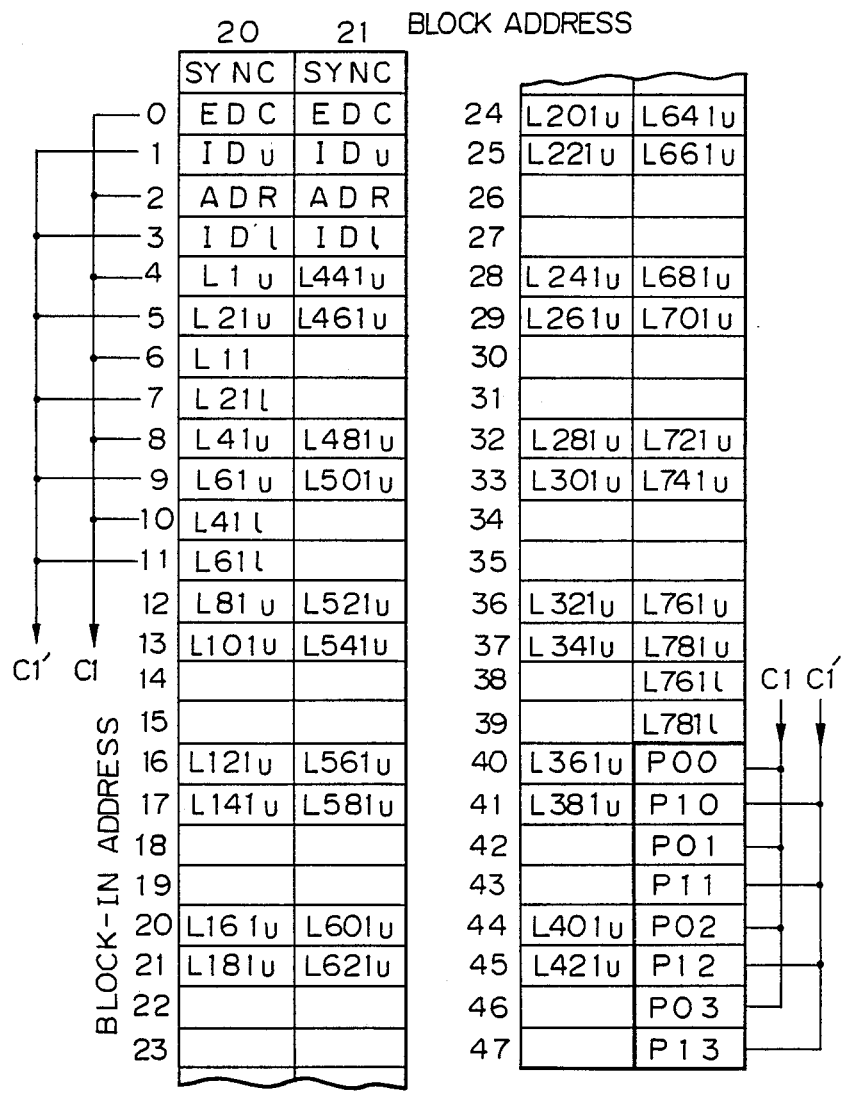

FIGS. 5 and 6 show the interleave of data of 801 words (=1602 symbols)/one channel of one field of the NTSC system in detail. FIGS. 5A and 5B show the data constitution in the block addresses 0 to 59. FIGS. 5B, 5C and 5D show that in the block addresses 60 to 99. FIG. 6 shows those in the block addresses 20 and 21 in detail.

As mentioned above, four symbols L0u, L0l, R0u, R0l of two words are positioned in the block-in addresses 1 and 3 in the block addresses 97 and 99. The odd-number designated words L1 to L799, R1 to R799 are arranged in the block addresses 20 to 59. The even-number designated words L2 to L800, R2 to R800 are arranged in the block addresses 60 to 99. By interleaving the recording positions of the odd-number designated words and even-number designated words, the poor effect caused upon reproduction when continuous words are error words can be reduced.

An example of the interleave of the symbols of the odd-number designated words will now be described. As shown in FIGS. 5A, 5B and 6, the data are sequentially arranged from the block-in addresses 4 and 6. In this case, the symbols L1u, R1u, L3u, R3u, ..., R19u on the upper side are successively arranged in the even-number designated block addresses 20, 22, 24, 26, ..., 58 in the block-in address 4. The symbols L1l, R1l, L3l, R3l, ..., R19l on the lower side are sequentially arranged in the even-number designated block addresses 20, 22, 24, 26, ..., 58 in the block-in address 6. The next odd-number designated symbols are arranged in the block-in addresses 5 and 7 in a manner similar to the above. By repeating the data arrangement in this manner, the R799u and R799l are located in the block-in addresses 37 and 39 in the block address 59.

In FIG. 6, P00 to P13 denote C1 parities regarding two blocks in the block addresses, for example, 20 and 21. That is, in the two blocks in the block addresses 20 and 21, the parities P00, P01, P02 and P03 of a (48, 44) Reed Solomon code (C1 code) are formed from the 48 symbols located in the even-number designated block-in address 20. The parities P10, P11, P12 and P13 of the (48, 44) Reed Solomon code (C1' code) are formed from the 48 symbols located in the odd-number designated block-in address 21.

As shown in FIGS. 5C and 5D, the even-number designated words are arranged in a manner similar to the odd-number designated words. The symbols R800u and R800 of the last word in the R channel are arranged in the block-in addresses 37 and 39 in the block address 99. According to the interleave shown in FIGS. 5 and 6, the recording positions of adjacent words are interleaved by four blocks in each of the even-number designated word series and odd-number designated word series in each channel. Successive recording of the upper side symbols and lower side symbols of one word is prevented. The influence of burst errors is reduced. In the actual write operation of the data into memory, odd-numbered words and even-numbered words are written into the tables shown in FIGS. 5A, 5B, 5C and 5D such as L0u, R0u, L1u, R1u, L2u, R2u, L3u, R3u, . . .

c. An example of the constitution of a header

FIG. 7A shows a portion of the header in one of the blocks in which C2 parity is not included. The header comprises: the ID signal IDu and IDl comprised of two symbols; the block address ADR comprised of one symbol; and a parity of the error detection code (EDC) comprised of three symbols, for instance, of a simple parity. Hereafter, this parity code is referred to as "third parity data". This error detection code is also used to detect a block sync signal. FIG. 7B shows the information of each of the three symbols IDu, IDl, and ADR when one symbol consists of six bits, i.e., one word consists of twelve bits. On the other hand, FIG. 7C shows the information of each of the three symbols IDu, IDl, and ADR when one symbol consists of eight bits, i.e., one word consists of sixteen bits.

As shown in FIG. 7B-I, when the least significant bit of the block address ADR is "0", namely, in the even number designated blocks (e.g., area P in FIG. 5C), the block address is indicated by a total of eight bits consisting of six bits of the ADR and the lower two bits of the ID. The upper four bits of the IDl are set to a frame address. The frame address indicates a track number. This frame address is used to discriminate the frame (i.e., track) in the high-speed reproducing mode in which the rotary heads scan a plurality of tracks, or in the editing mode. The lower three bits of the IDu are set to a track address. The track address, i.e., channel address, is used to discriminate a channel when one track is divided into six channels. Six kinds of compressed audio PCM signals are recorded in each of the six channels The upper three bits of the IDu are used as an ID signal. This ID signal can be used as a head search signal to select a desired track or a time code to indicate the position of a recording signal on the tape. This ID signal can be also used to discriminate the recording mode of the recording signals, e.g., stereo/bilingual, prohibition of copy, or the like.

As shown in FIG. 7B-II, when the least significant bit of the block address ADR is "1", that is, in the odd-number designated block addresses 97, 99, including main data (e.g., area Q in FIG. 5D), the six bits of the ADR are used as a block address, which is an insufficient number of bits to express the block address. However, the correct block address can be recovered by interpolation using the block addresses of the blocks before and after this block. In this case the area of the IDu is used as symbols L0u and R0u in this embodiment on the upper side of data. The area of the IDl is used as symbols L0l and R0l in the embodiment on the lower side of data.

FIG. 7B-III shows the contents of data in the odd-numbered blocks 21, 23, 25, .., 95 (e.g., area Y). The ID signal is the so-called sub-code data. This ID signal is used to discriminate the sampling frequency, the number of words, etc., in addition to the above-mentioned use. When three bits are not sufficient to express this control information, six bits included in the odd-numbered blocks are used.

FIG. 7B-IV shows the contents of data in the odd-numbered blocks 1, 3, 5, . . . , 19 (e.g., area Z) and C2 parity is inserted in the ID area.

FIG. 7C shows the constitution of a header when one symbol consists of eight bits. In the block in which the least significant bit of the block address is "0", an ADR of 8 bits is set to a block address, the IDl is set to a track address (3 bits) and a frame address (5 bits), and the IDu is assigned to the ID signal (FIG. 7C-I). In the block in which the least significant bit of the block address is "1", the 8 bits of the ADR are used as a block address and the IDu and IDl are assigned to the ID signal, data or C2 parity, respectively (FIG. 7C-II).

Even in any of the cases where one symbol consists of 6 bits or where one symbol consists of 8 bits, no data is included in the blocks 20, 22, 24, . . . , 112 in which the least significant bit of the block address is "0", so that as mentioned above, the symbols in the block in which the least significant bit of the block address in the header is "0" are not C2 encoded. Namely, C2 encoding need not be performed, since no data is included in the blocks. In this way the block address, frame address, and track address are prevented from being lost by the C2 parity.

The invention is not limited to recording the audio signals associated with the video signal of the NTSC system but can be also applied to the case where the audio signals associated with the video signal of the CCIR system are recorded. In the CCIR system, since the field frequency is 50 Hz, the data of one field in the case of the sampling frequency of 48 kHz consists of 48000×1/50=960 words (L0 to L959, R0 to R959).

FIGS. 8A and 8B show a frame constitution in the case where the invention is applied to the CCIR system. Forty-eight symbols, excluding the block sync signal, are arranged in the vertical direction and 116 blocks are arranged in the lateral direction. The symbols of the head words L0 and R0 are included in a part of the header. The C2 encoding is performed for this data. The interleave of the even-number designated words and odd-number designated words, the C1 encoding, and the C2 encoding are similar to those in the case of the NTSC system.

d. Recording and reproducing circuit

Figure 9:
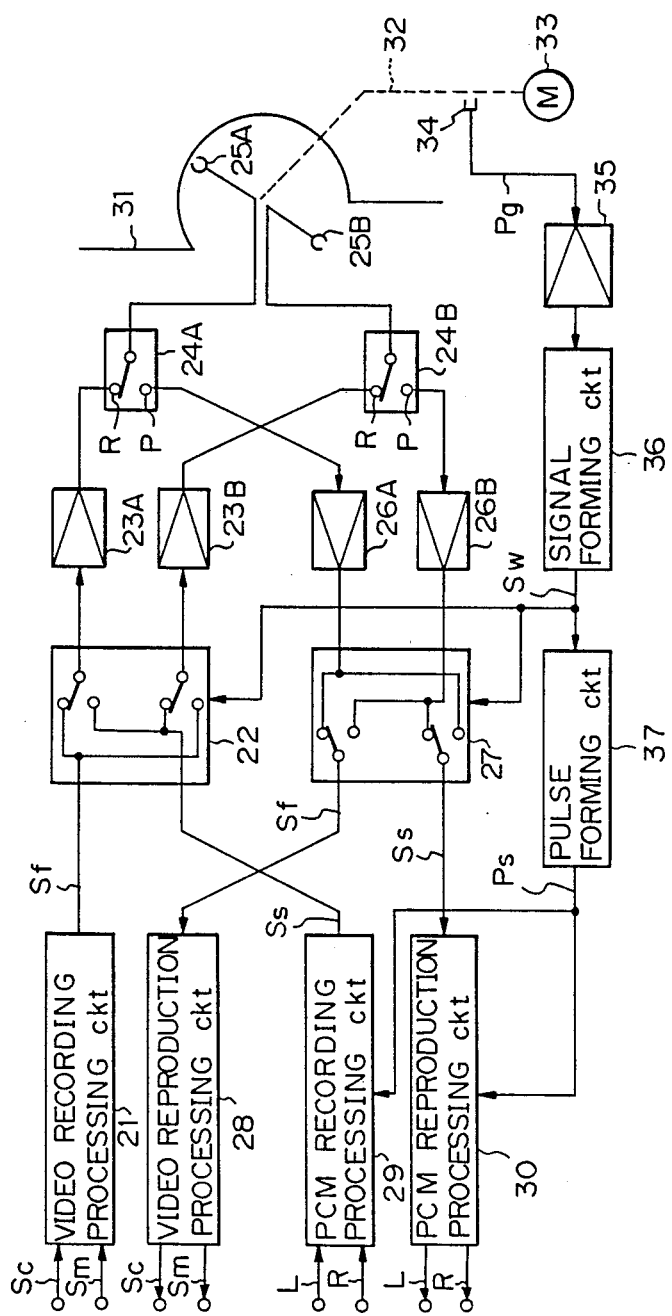
FIG. 9 is a block diagram of an example of a recording/reproducing circuit of a rotary head type VTR to which the invention can be applied.

FIG. 9 shows an example of a recording/reproducing circuit of a rotary head type VTR to which the invention can be applied. In this VTR, the video signal and PCM audio signals are recorded onto a magnetic tape by a single scan.

In FIG. 9, reference numerals 25A and 25B indicate a pair of rotary heads mounted inside of a drum 25C. The rotary heads 25A and 25B have an angle interval of 180° therebetween and are rotated at a frame frequency $f_F$ (29.97 Hz in the case of the NTSC system) by a motor 33 through a rotating shaft 32. A magnetic tape 31 is wrapped obliquely around the peripheral surface of the rotary head drum 25C, over an angular range of about 210° of head travel, and is transported past the head drum 25C at a constant velocity for its rotational peripheral surface.

In this case, the rotational phases of the rotary heads 25A and 25B are controlled so as to synchronize with the video signal to be recorded upon recording and are servo controlled so as to correctly scan the track upon reproduction.

Figure 10:
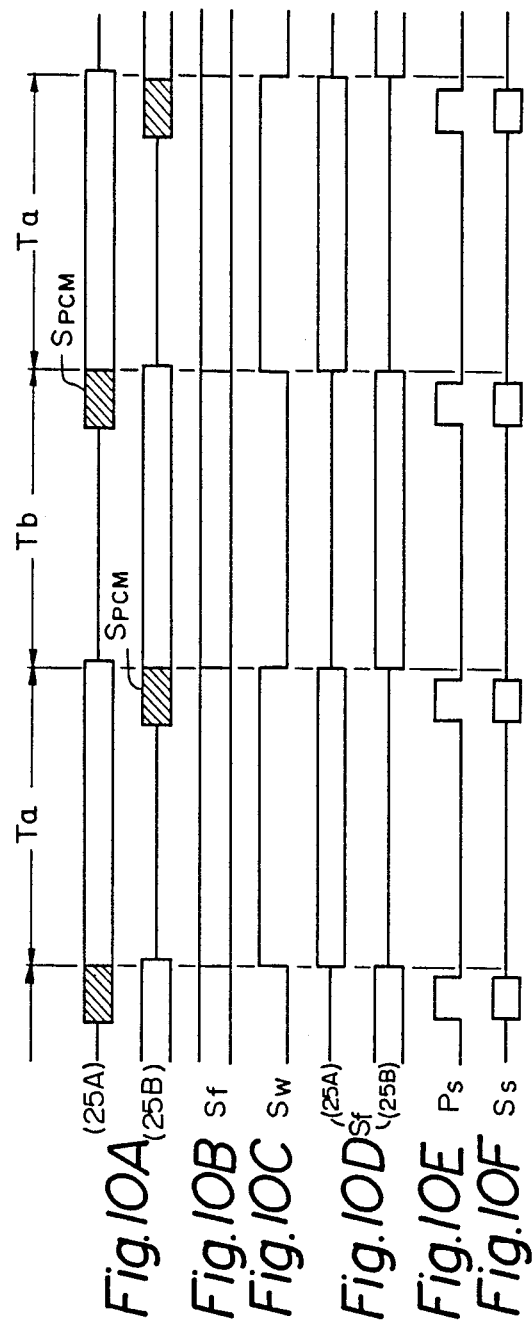
FIGS. 10A, 10B, 10C, 10D, 10E, and 10F are timing charts for use in explaining the operation of the recording/reproducing circuit depicted in FIG. 9.

Therefore, as shown in FIG. 10A, in every other field period Ta, the rotary head 25A scans the PCM interval SPCM about (1/6) field period before the video interval is scanned in the period Ta. On the other hand, in every other field period Tb, the rotary head 25B scans the PCM interval SPCM about (1/6) field period before the video interval is scanned in the period Tb. The above-mentioned format is similar to U.S. Pat. No. 4,551,771.

Upon recording of the video signal, a color video signal $S_{2c}$ and a frequency modulated monaural audio signal $S_m$ are supplied to a video recording processing circuit 21. As shown in FIG. 10B, a frequency multiplexed signal $S_f$ comprised of an FM luminance signal, a low frequency band converted carrier chrominance signal, FM audio signals, and a pilot signal for auto tracking is continuously taken out. This signal $S_f$ is supplied to a switching circuit 22.

Pulse generating means 34 is provided for the rotating shaft 32. Frame period pulses $P_g$ indicative of the rotational phases of the rotary heads 25A and 25B are taken out. The pulses $P_g$ are supplied to a signal forming circuit 36 through a shaping amplifier 35. As shown in FIG. 10C, a pulse signal SW, which is inverted for each period Ta and Tb, is formed from the signal forming circuit 36. The pulse signal SW is supplied as a control signal to the switching circuit 22. The switching circuit 22 is switched between the state shown in the diagram and a state opposite to that shown in the diagram for the periods Ta and Tb. Therefore, as shown in FIG. 10D, the signal Sf is alternately taken out of the switching circuit 22 for each period Ta and Tb.

The frequency multiplexed signal Sf is supplied through recording amplifiers 23A and 23B and, further, through recording side terminals R of switching circuits 24A and 24B to the rotary heads 25A and 25B. The switching circuits 24A and 24B are timed to switch in synchronism with the rotation of the heads in the conventional manner. Therefore, the signal $S_f$ is sequentially recorded as a video interval onto the magnetic tape 31 during each period Ta and Tb.

Further, stereo audio signals L and R are supplied to a PCM recording processing circuit 29. The signal SW is supplied to a pulse forming circuit 37. As shown in FIG. 10E, a pulse $P_s$, which is set to "1" for a period of time when each of the rotary heads 25A and 25B scans the PCM interval, is formed in which a change point of the signal SW is used as a reference. This pulse $P_s$ is supplied to the PCM recording processing circuit 29 and as shown in FIG. 10F, the signals L and R of one field period are time base compressed for a period of $P_s$="1" and converted into the PCM signals. Moreover, they are digitally modulated and taken out as a PCM signal $S_s$.

For the field period Ta, the signal $S_s$ is supplied to the rotary head 25B through the signal path comprised of the switching circuit 22 to the amplifier 23B to the terminal R of the switching circuit 24B. For the period Tb, it is supplied to the rotary head 25A through a signal path of the switching circuit 22 to the amplifier 23A to the terminal R of the switching circuit 24A. Therefore, prior to recording the signal $S_f$ in the video interval, the signal $S_s$ is recorded in the PCM interval.

Upon reproduction, the signals $S_s$ and $S_f$ are alternately reproduced from the track of the magnetic tape 31 by the rotary heads 25A and 25B. The reproduced signals $S_s$ and $S_f$ are respectively supplied through reproducing side terminals P of the switching circuits 24A and 24B and, further, through reproducing amplifiers 26A and 26B, respectively, to a switching circuit 27. The signal SW is supplied as a control signal to the switching circuit 27. The signal $S_f$ is continuously taken out of the switching circuit 27 and the signal $S_s$ is taken out at every field period.

The signal $S_f$ from the switching circuit 27 is supplied to a video reproduction processing circuit 28. The original color video signal $S_c$ and monaural audio signal $S_m$ are taken out of the video reproduction processing circuit 28. The signal $S_s$ from the switching circuit 27 is supplied to a PCM reproduction processing circuit 30. The pulse $P_s$ is supplied as a window signal to the PCM reproduction processing circuit 30. The original stereo audio signals L and R are taken out of the signal $S_s$.

Figure 11:
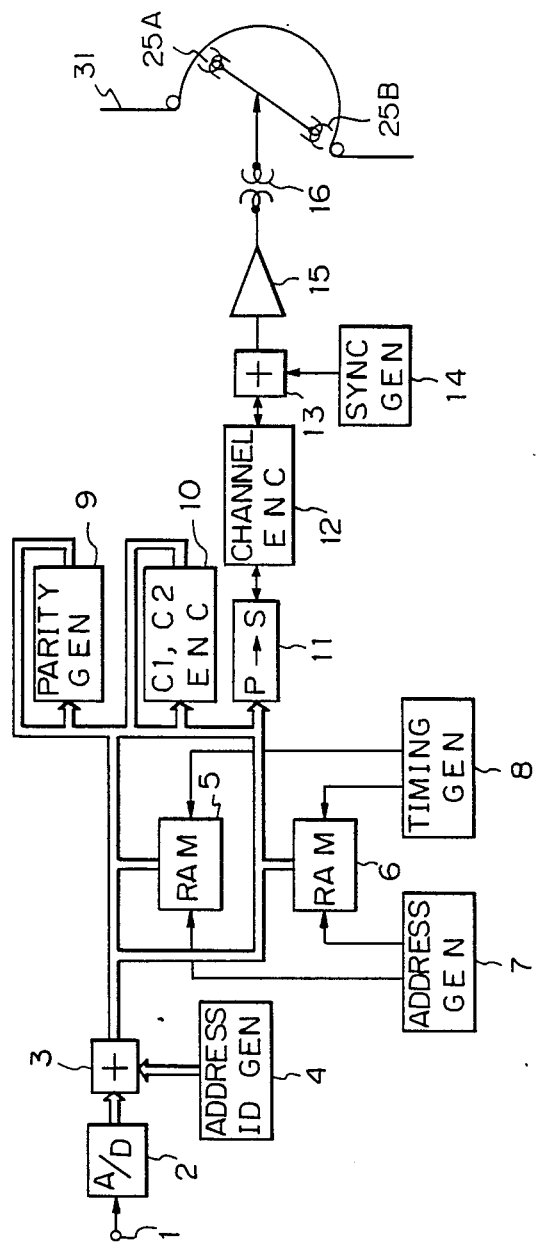
FIG. 11 is a block diagram of an example of a PCM recording processing circuit.

An example of the foregoing PCM recording processing circuit 29 will be described with reference to FIG. 11. In FIG. 11, analog audio signals are supplied to an input terminal indicated by 1. These analog audio signals are converted into PCM signals by an A/D converter 2. Output data from the A/D converter 2 is supplied to an adder 3. The address signal and ID signal from an address/ID generating circuit 4 are supplied to the adder 3 where they are added to the PCM audio signals.

The output signal of the adder 3 is used as a data input to RAMs 5 and 6. Each of the RAMs 5 and 6 has a capacity sufficient to store the symbols of one frame. An address generating circuit 7 and a timing generating circuit 8 are provided in conjunction with the RAMs 5 and 6 and are controlled so as to write and read out data into and from the RAMs 5 and 6 on a symbol unit basis. The reason why two RAMs 5 and 6 are provided is that for a period when data is written into one of the RAMs, data is read out of the other RAM and error correction encoded.

The audio PCM signals read out from one of the RAMs 5 and 6 are supplied to an encoder 10 of the C1 and C2 codes and the parities of the C1 and C2 codes are formed. These parities are written into either one of the RAMs 5 and 6. A parity generating circuit 9 is provided and the parity of the error detection code for three symbols included in the header is formed. After completion of the error correction encoding process, the digital signals consisting of the parity symbol, block address, ID signal, and data are read out of the RAMs 5 or 6, block by block, and supplied to a parallel/serial converter 11 where they are converted into serial data.

The output data from the parallel/serial converter 11 is supplied to a channel encoder 12 and subjected to a channel encoding process such as 8 to 10 conversion or the like. The output of the channel encoder 12 is supplied to an adding circuit 13 where a block sync signal is added from a sync generator 14. The recording signals output from the adder 13 are supplied to rotary heads 25A and 25B through a recording amplifier 15 and a rotary transformer 16, and recorded onto a magnetic tape 31 by the rotary heads 25A and 25B.

e. Word number control circuit

Figure 12:
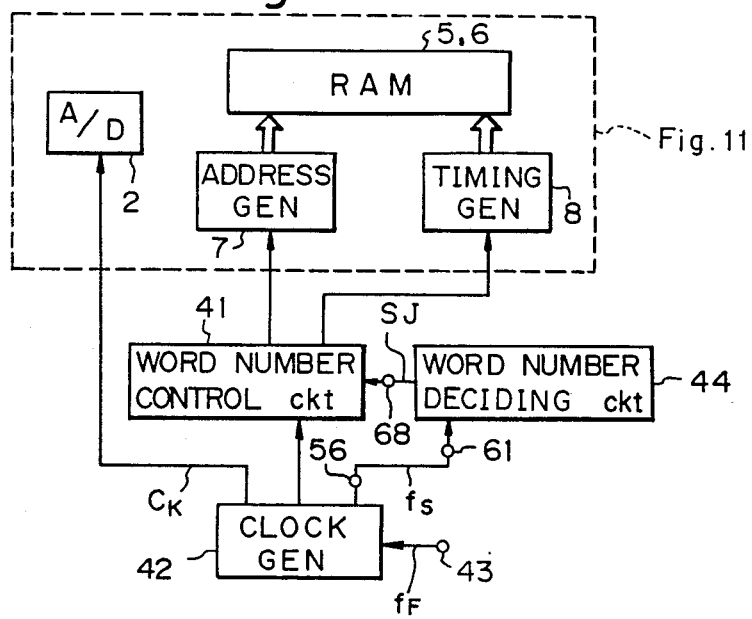
FIG. 12 is a block diagram of a word number control circuit.

As shown in FIG. 12, the PCM recording processing circuit 29 is provided with a word number control circuit 41 to control the number of words included in one frame of the code constitution so as to be set to 800 words or 801 words in conjunction with the address generating circuit 4 and the timing generating circuit 8. When the number of words included in one frame of the code constitution is 800 words, for example, the words of L800 and R800 are not recorded and in place of these words, zero data as dummy data is recorded.

A clock signal from a clock signal generating circuit 42 and a decision signal SJ from a word number deciding circuit 44 are supplied to the word number control circuit 41. Sampling clock pulses, having a frequency $f_s$, formed by the clock generating circuit 42 are supplied to the word number deciding circuit 44. A decision output of the word number deciding circuit 44 is supplied to the word number control circuit 41 at an output terminal 68 thereof. The word number control circuit 41 controls the address generating circuit 7 and timing generating circuit 8 on the basis of a decision output $S_J$ to designate whether the number of words included in one frame of the code constitution is 800 words or 801 words. Further, a signal of the frame frequency $f_F$ (29.97 Hz) of the NTSC system is supplied by an external source (not shown) from a terminal 43 to the clock generating circuit 42.

Sampling clocks CK from the clock generating circuit 42 are supplied to the A/D converter 2 and used to digitize the analog audio signals. On the other hand, when the audio PCM signals are supplied from the outside, the external audio PCM signals are supplied to a sample and hold circuit and sampled by the sampling clocks from the clock generating circuit 42. Therefore, any of the analog audio signals and audio PCM signals are synchronized with the internal sampling clocks.

FIG. 13 shows an arrangement of an example of the clock generating circuit 42. The clock generating circuit 42 comprises a phase locked loop (PLL) to generate fundamental clock pulses of a frequency $f_O$ and a PLL to generate a sampling frequency $f_s$.

The relation between the sampling frequency $f_{s1}$, $f_{s2}$, $f_{s3}$ (48 kHz, 44.1 kHz, 32 kHz) and the horizontal frequency $f_h$ (15.734265 kHz) of the NTSC system is expressed by the following equation.

$$f_{s1} = f_h/5 \times 32 \times 143 \times 160 \times 1/125 \times 1/384$$
$$= 48,000$$
$$f_{s2} = f_h/5 \times 32 \times 143 \times 147 \times 1/125 \times 1/384$$
$$= 44,100$$
$$f_{s3} = f_h/5 \times 32 \times 143 \times 160 \times 2/3 \times 1/125 \times 1/384$$
$$= 32,000$$

In the case of the sampling frequency $f_{s1}$ of 48 kHz, the above equations are modified as follows.

$$525 \, f_F/5 \times 32 \times 143 \times 1/125 \times 1/384 \times 480/3 \times 512$$

-continued $$= 512 f_{s1}$$
$$= f_F \times (525 \times 32 \times 143)/5 \times (480 \times 512)/(125 \times 3 \times 384)$$
$$= f_F \times 480480 \times 1/1125 \times 4 \times 480$$

On the other hand, in the case of the CCIR system ($f_h = 15.625$ kHz), $$f_{s1} = f_h/5 \times 32 \times 144 \times 160 \times 1/125 \times 1/384$$
$$= 48,000$$
$$f_{s2} = f_h/5 \times 32 \times 144 \times 147 \times 1/125 \times 1/384$$
$$= 44,100$$
$$f_{s3} = f_h/5 \times 32 \times 144 \times 160 \times 2/3 \times 1/125 \times 1/384$$
$$= 32,000$$

In FIG. 13, the signal of the frame frequency $f_F$ and an output signal of a frequency dividing circuit 47 are supplied to a phase comparing circuit indicated at 45. An output signal of the phase comparing circuit 45 is supplied to a voltage controlled oscillator (VCO) 46. The frequency dividing ratio N1 of the frequency dividing circuit 47 is set to (N1=480480) in the case of the NTSC system and to (N1=557056) in the case of the CCIR system. Therefore, the frequency $f_0$ of the fundamental clocks generated at an output of the VCO 46 is set to:

$f_0 = 14.4$ MHz (NTSC system)
$f_0 = 13.926$ MHz (CCIR system)

The fundamental clocks are taken out to an output terminal 48 and supplied to a frequency dividing circuit 49. The frequency dividing ratio N2 of the frequency dividing circuit 49 is selected to have the following values:

N2 = 1125 (NTSC system)
N2 = 1088 (CCIR system)

The output signal of the frequency dividing circuit 49 is supplied to a phase comparing circuit 50. The output signal from a frequency dividing circuit 53 is supplied to the phase comparing circuit 50. The output signal of the phase comparing circuit 50 is supplied as a control signal to a VCO 51. The output signal of the VCO 51 is supplied to a ¼ frequency dividing circuit 52. The output signal of the frequency dividing circuit 52 is supplied to the frequency dividing circuit 53.

The output signal of the frequency dividing circuit 52 is taken out to an output terminal 54 and is also supplied to a frequency dividing circuit 55. The frequency dividing ratio of the frequency dividing circuit 55 is set to 1/128. The output signal $f_s$ of the frequency dividing circuit 55 is taken out to an output terminal 56. The output signal of the frequency dividing circuit 49 is 12.8 kHz. As shown by the table in FIG. 13, the frequency dividing ratio N3 of the frequency dividing circuit 53 is selected to have the following values, depending on the sampling frequency (i.e. N3: $f_s$): 480: 48 kHz, 441: 44.1 kHz, 320: 32 kHz. A signal of 12.8 kHz is generated from the frequency dividing circuit 53. A signal of a frequency of 128 $f_s$ is supplied to the output terminal 54. A signal of the sampling frequency $f_s$ is supplied to the output terminal 56.

Figure 14:
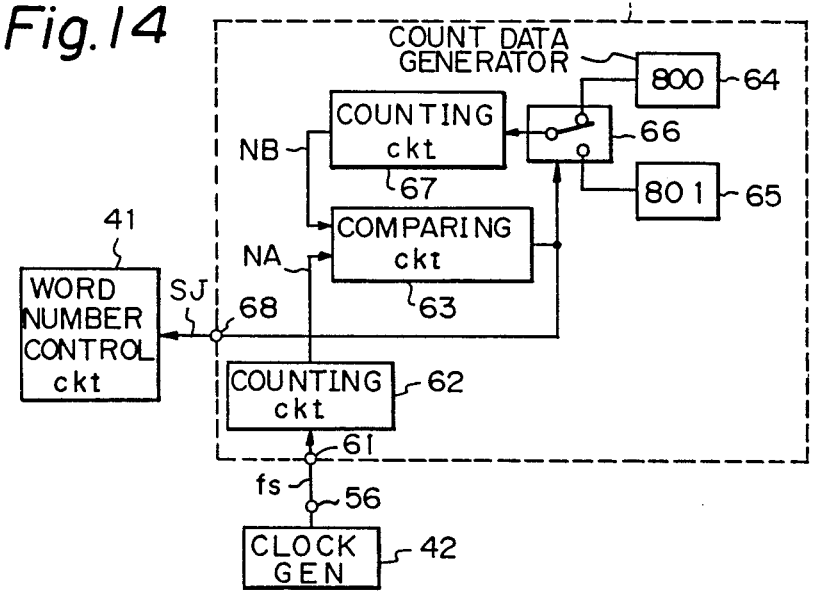
FIG. 14 is a block diagram of a word number deciding circuit which is used to explain the operation of the circuit depicted in FIG. 13.

Referring again to FIG. 12, the output signal of the sampling frequency $f_s$ from terminal 56 of the clock generating circuit 42 is supplied to an input terminal 61 of the word number deciding circuit 44 shown in more detail FIG. 14. A counting circuit indicated at 62, which is constituted by a counter is provided. An output signal of a count value NA is generated from the counting circuit 62. This count value NA is supplied to one input of a comparing circuit 63.

Reference numerals 64 and 65 denote data generating circuits to generate numerical value data of 800 and 801, respectively. Output signals of the count data generating circuits 64 and 65 are supplied to opposite terminals of a single pole, double throw switching circuit 66. The output signal of the switching circuit 66 is supplied to a counting circuit 67. A count value NB from the counting circuit 67 is supplied to the other input of the comparing circuit 63. The comparing circuit 63 compares the magnitudes of the count values NA and NB and generates the decision signal $S_J$. The decision signal $S_J$ is taken out to an output terminal 68 and is also supplied as a control signal to the switching circuit 66. The decision signal $S_J$ taken out to the output terminal 68 is supplied to the word number control circuit 41.

The operation of the word number deciding circuit 44 will be described with reference to FIGS. 15A to 15D. FIG. 15A shows the timing of the field period. For example, assuming that the numerical value of 800 from the count data generating circuit 64 is first selected, the count value NB of the counting circuit 67 is also set to 800 as shown in FIG. 15B. On the other hand, the counting circuit 62 counts the sampling clocks formed in the clock generating circuit 42 and generates the count value NA of the value which is sequentially increased as shown in FIG. 15C.

The count values NA and NB are compared by the comparing circuit 63 at the timing of the field period. For instance, when NA=799, NB=800, since NA≦NB, as shown in FIG. 15D, the decision signal $S_J$ of "0" is generated. When $S_J$="0", the switching circuit 66 selects the data of 800 from the data generating circuit 64. The output of the counting circuit 67 is set to 1600 and at the same time, the number of words in one frame of the code is set to 800 words.

The count values NA and NB are again compared at the timing of the next field period. When NA=1601 in this comparison, since NB=1600, NA>NB and the decision signal $S_J$ is set to "1" as shown in FIG. 15D. Therefore, the switching circuit 66 selects the data of 801 from the data generating circuit 65. The output of the counting circuit 67 is set to 2401 and the number of words in one frame of the code is set to 801.

An operation similar to the above is repeated and the number of words to be recorded and the number of words of the input data are made coincident in an average manner. Since the values of the counting circuits 62 and 67 are limited, when the field period is repeated a predetermined number of times, their count values are returned to the initial values, respectively.

f. Modification

In this embodiment, 800 and 801 have been used as two kinds of numerical value data. However, it is also possible to use numerical values of, e.g., 800 and 802 which are close to the quotient when the sampling frequency $f_s$ is divided by the field frequency. On the other hand, three or more kinds of numerical values can be also selectively used without limiting to two kinds.

In the invention, error correction codes other than the Reed Solomon code can be used.

According to the invention, even if the number of words included in one frame of the code constitution of digital information signals is an integer, the recording of the number of words which is equal to the quotient when the sampling frequency is divided by the field frequency in an average manner can be performed. The occurrence of the asynchronization between a video image and an audio sound can be prevented. A discrimination signal indicative of the number of words included in one frame of the code constitution is recorded together with the PCM signals. Therefore, in the data processing on the reproduction side, the number of words in one frame can be known from this discrimination signal and the data processing on the reproduction side can be executed without any trouble.

What is claimed is:

1. A digital signal recording apparatus for recording signals which have been digitally sampled at a first predetermined frequency and subject to error correction encoding into units having a second predetermined frequency and in which the first predetermined frequency cannot be evenly divided by the second predetermined frequency, wherein the recording apparatus is of the type which includes an analog to digital converter for converting analog input signals into digital information signals, an encoder for error encoding the digital information signals, memory means for storing the product of the error encoding, an address generator for controlling the write and read operations of the memory means, and recording means for recording the output data of the encoder onto a magnetic tape by means of rotary magnetic heads, the digital signal recording apparatus comprising:

integer setting means for setting an integer count value (NB) of at least 2 which is an integer value near the quotient obtained by dividing the first predetermined frequency by the second predetermined frequency;

first counter means for counting the number of input samples to be recorded and outputting a corresponding first count signal (NA);

means for comparing the count value (NA) of the first count signal (NA) and the count value (NB) selected from the numerical values of 2 or more set by the integer setting means and outputting a decision signal ($S_J$);

word number control means supplied with the decision signal ($S_J$) for determining the number of samples to be included in the error correcting code unit in response to the decision signal ($S_J$); and means controlled by the word number control means for controlling the address to be addressed in the memory means by the address generator.

2. A digital signal recording apparatus according to claim 1, in which the number of samples is equal to the quotient obtained when the first predetermined frequency is divided by an integer multiple of the rotational frequency of the rotary heads.

3. A digital signal recording apparatus according to claim 2 wherein:

the integer setting means includes a second counting means, a circuit for generating data of a plurality of integer values which are close to the quotient of the division and a switching means for selectively supplying one of the plurality of data to the second counting means, the second counting means generating a corresponding second count value (NB);

wherein the comparing means compares the first count value (NA) with the second count value (NB) in outputting the decision signal ($S_J$);

the switching means is supplied with and controlled by the decision signal; and further comprising means supplied with and controlled by the decision signal for controlling the number of samples to be recorded in one track.

4. A digital signal recording apparatus according to claim 2, in which the input signals are a video signal and audio signals, and audio PCM signals and the video signal are sequentially recorded in the same track on the recording medium in a single scan of the rotary heads by time sharing the digital information signals, which were time compressed, with the video signal.

5. A digital signal recording circuit according to claim 1, in which the frequency used to divide the first predetermined frequency is a frequency which is an integer multiple of the frame frequency of a color television system.

6. A digital signal recording apparatus according to claim 5, in which one field period of the color television system is used as a unit of the error correcting code and the number of data words of the samples is set to 800 and 801 when the color television system is NTSC system and the first predetermined frequency is 48 kHz.

7. A digital signal recording apparatus according to claim 1, in which the number of samples included in a unit of the error correcting code encoding is changed and the first count value (NA) is recorded onto the magnetic tape together with the output of the encoder.

8. A digital signal recording apparatus according to claim 7, in which the encoding is performed by the encoder such that the information symbols are arranged in blocks with each information symbol of the digital information signals being included in a different first and second error correcting code series, and a block address for discriminating a block of the information symbols, a part of the data of the digital information signals, parity data of the second error correcting code series and a discrimination signal indicative of the number of samples as a group are recorded as a header information of the digital information signals.

9. A digital signal recording apparatus according to claim 8, in which a block of the error correcting code is formed by the header information data and digital main information data, and wherein the digital signal recording apparatus further comprises:

means for forming the first error correcting code series including first parity data for a set of symbols in which a plurality of the blocks are arranged with regard to all of the symbols included in the blocks, and forming the second error correcting code series including second parity data with regard to a part of the header data and all of the main data portion.

10. A digital signal recording apparatus according to claim 9, in which the second parity data series is generated for the data series of block-in address including a part of the main information data.

* * * * *